United States Patent [19]

Weitzenhof

[11] Patent Number: 5,009,401
[45] Date of Patent: Apr. 23, 1991

[54] AIR SPRING SUSPENSION SYSTEM WITH DUAL PATH ISOLATION

[75] Inventor: David A. Weitzenhof, Akron, Ohio

[73] Assignee: Bridgestone/Firestone, Inc., Akron, Ohio

[21] Appl. No.: 128,958

[22] Filed: Dec. 4, 1987

Related U.S. Application Data

[63] Continuation-in-part of Ser. No. 885,124, Jul. 14, 1986, Pat. No. 4,712,776.

[51] Int. Cl.$^5$ .................................................. F16F 3/08
[52] U.S. Cl. .............................. 267/64.21; 188/321.11; 280/668
[58] Field of Search ............... 267/64.21, 64.19, 64.23, 267/64.24, 64.27, 195, 220, 64.28; 188/322.12, 321.11; 280/668, 711; 384/223, 220, 221, 420, 424

[56] References Cited

U.S. PATENT DOCUMENTS

| Re. 31,184 | 3/1983 | Lederman | 280/668 |
|---|---|---|---|
| 2,926,011 | 2/1960 | Slemmons | 267/65 |
| 2,978,256 | 4/1961 | Bertsch | 280/124 |
| 2,985,445 | 5/1961 | Bowser | 267/65 |
| 3,046,000 | 7/1962 | Polhemus | 267/64 |
| 3,074,709 | 1/1963 | Ballard | 267/65 |
| 3,954,257 | 5/1976 | Keijzer | 267/65 |
| 4,248,454 | 2/1981 | Cotter | 280/668 |
| 4,256,292 | 3/1981 | Sullivan, Jr. | 267/8 R |
| 4,298,193 | 11/1981 | Mourray | 267/63 R |
| 4,319,768 | 3/1982 | Youngdale | 280/668 |
| 4,434,977 | 4/1984 | Chiba | 267/33 |
| 4,478,396 | 10/1984 | Kawaura | 267/8 R |
| 4,518,154 | 5/1985 | Merkle | 267/34 |
| 4,531,759 | 7/1985 | Rezanka | 280/668 |
| 4,555,096 | 11/1985 | Pryor | 267/8 R |
| 4,592,540 | 6/1986 | Yokoya | 267/8 R |
| 4,671,323 | 6/1987 | Buma | 267/64.21 |

FOREIGN PATENT DOCUMENTS

| 2100338 | 8/1972 | Fed. Rep. of Germany . | |
| 2401787 | 3/1979 | France . | |
| 241538 | 11/1985 | Japan . | |
| 0694668 | 7/1953 | United Kingdom | 267/220 |

Primary Examiner—Douglas C. Butler
Assistant Examiner—Mark T. Le
Attorney, Agent, or Firm—Ronald Brietkrenz

[57] ABSTRACT

A suspension system for a vehicle having a shock absorber strut with a reciprocal piston rod located within a cylinder, and attachments for securing the piston rod and cylinder to spaced parts of the vehicle. An air spring includes a rigid annular canister mounted on the piston rod by a resilient rotatable mount. The canister forms a fluid pressure chamber in conjunction with a flexible diaphragm, one end of which is sealingly connected to the cylinder by an annular rigid sleeve which forms an air spring piston. The flexible diaphragm has inner and outer radially spaced portions connected by a rolling portion. A rigid member resembling a cutaway can is mounted on the rigid canister portion of the air spring and extends about a predetermined portion of the outer portion of the flexible diaphragm and restrains outward expansion of said portion. Restriction of the outward expansion of only a portion of the flexible diaphragm exerts a lateral force on the strut to counteract the unbalanced lateral forces acting thereon due to the offcenter mounting of the strut with respect to the point of contact of the vehicle wheel with the pavement. The suspension system furthermore provides dual path isolation for separating the canister from the vehicle by a primary elastomeric isolator ring and from the strut by secondary elastomeric bushings mounted on the strut, which bushings also provide an upper air seal for the fluid pressure chamber.

20 Claims, 4 Drawing Sheets

AIR SPRING SUSPENSION SYSTEM WITH DUAL PATH ISOLATION

CROSS-REFERENCE TO RELATED APPLICATION

This application is a continuation-in-part of copending application Ser. No. 885,124, filed July 14, 1986, now U.S. Pat. No. 4,712,776.

TECHNICAL FIELD

The invention relates generally to vehicle suspension systems and in particular to an improved vehicle suspension system including an air spring in combination with a strut-type fluid shock absorber, and more particularly to such a suspension system which provides offset loading on the shock absorber strut to counteract bending movement caused by the vertical load at tire contact patch which is offset from the strut centerline. The invention also provides dual path isolation in a compact package on an air strut.

BACKGROUND ART

Fluid shock absorber struts which are used in a vehicle suspension system often experience a bending moment caused by the offset of the tire contact patch with the roadway from the strut centerline. This offset loading increases the sliding friction between the piston rod and surrounding cylinder, increasing harshness and reducing the life of the shock absorber strut. One of the most commonly used means to counteract this offset loading on a fluid shock absorber strut such as a McPherson strut, is by the use of a system wherein a counter lateral force is exerted on the strut by the use of an offset or angled coil spring surrounding the piston rod and cylinder.

Some examples of prior art suspension systems which attempt to overcome this offset loading problem are shown in the following patents.

U.S. Pat. No. 3,954,257 discloses a suspension system in which the extended end of the piston rod is connected to the underside of an upper spring and bearing assembly positioned within a suitable bracket connecting the suspension system to the vehicle. This suspension unit includes a surrounding helical spring and a rolling flexible diaphragm member connected to a periphery of a housing in which a fluid shock absorber cartridge is mounted with the upper end of the flexible diaphragm being connected to a spring retaining ring.

U.S. Reissue Pat. No. 31,184 discloses another suspension system which attempts to reduce this offset loading problem by the use of an elastomeric mounting arrangement at the extended end of the piston rod in combination with a surrounding coil spring. German Patent No. 2,100,338 discloses another suspension system in which the piston rod of a fluid shock absorber is set at an offset angle to match the suspension system in order to counteract the heretofore unbalanced forces exerted thereon.

Another type of vehicle suspension system uses pneumatic springs commonly referred to as air springs in place of a fluid shock absorber. In these air springs one or more pistons act within a chamber filled with a pressurized fluid or gas causing compression and expansion of the fluid contained in the pressure chamber, to absorb the road shocks as the pistons move between jounce and rebound positions. Some examples of prior art vehicle air springs are shown in U.S. Pat. Nos. 2,926,011; 2,985,445; 2,978,256; 3,046,000; and 3,074079.

Therefore, the need exists for a suspension system using a fluid shock absorber strut in combination with means for offsetting the off center lateral forces exerted on the shock absorber strut. There is no known suspension system of which we are aware which accomplishes this by the combination shock absorber strut/air spring suspension system in which the air spring is provided with means of exerting an offset loading to counteract the bending moment caused by the unbalanced load exerted on the shock absorber strut and without interfering with the tire when in the jounce position.

Another problem that exists with suspension units using a fluid shock absorber strut in combination with an air spring is the ability to provide dual path isolation in a compact package or unit on a steerable air strut. Dual path isolation means that the strut shaft or piston rod is separately isolated by an elastomeric material from the air spring, and in particular the air canister component thereof, and that the canister also is isolated by an elastomer from the vehicle chassis. Heretofore, dual path isolators have been used to reduce ride harshness and noise in strut type applications, but not in combination with an air spring. Some examples of dual path type isolators are shown in U.S. Pat. Nos. 4,248,454; 4,256,292; 4,298,193; 4,319,768; 4,434,977; 4,478,396; 4,531,759 and French Patent No. 2401-787. Also, shock absorbing struts have been used in combination with air springs, such as is shown in U.S. Pat. Nos. 4,555,096; 4,592,540; 4,518,154 and 3,954,257, and Japanese Patent No 241538. However, these assemblies do not provide dual path isolation.

Likewise, none of these known prior art suspension systems show a unit in which a shock absorber strut is combined with an air spring wherein the air canister portion of the air spring is separated from the vehicle chassis by a primary elastomeric isolator, in combination with a bearing which allows the dual isolation to be used on a steerable air strut together with a secondary elastomeric isolator which separates the air canister from the piston rod of the shock absorber; and in which the secondary isolator also functions as a nonrotatable air seal for one open end of the air spring, in a compact unit as is the present invention described in detail below and set forth in the claims.

DISCLOSURE OF THE INVENTION

Objectives of the invention include providing an improved air spring suspension system which uses a usual hydraulic shock absorber strut in combination with an air spring having a flexible sleeve or diaphragm, a predetermined portion of which is surrounded by a rigid cutaway can-like member which will push the sleeve to one side by restricting the expansion of the sleeve in a predetermined direction while permitting the unrestrained portion of the sleeve to expand outwardly due to the internal fluid pressure; and in which the deformation of the flexible sleeve creates an offset loading which when properly placed will counteract the natural offset or lateral forces exerted on the shock absorber strut by the offset vehicle load.

Another objective of the invention is to provide such an improved suspension system in which the flexible sleeve which defines the fluid chamber, can be supplied with various amounts of pressurized fluid to affect expansion and contraction of the chamber and compensate for vehicle loading, and which will eliminate the heretofore required helical suspension spring surrounding the shock absorber strut.

A further objective is to provide such an improved air spring suspension system in which the piston rod of the shock absorber strut is secured to a vehicle mounting bracket by elastomeric bushings to assist in absorbing road forces exerted thereon, in which the piston rod end is mounted in the resilient cushioning member, and in which a compression bumper is located within the fluid chamber of the air spring and is engaged by a bumper stop mounted in a fixed position with respect to the cylinder to prevent damage to the shock absorber strut upon the suspension system experiencing severe compression or jounce position.

A still further objective of the invention is to provide such an improved air spring suspension system in which the amount of retention of the flexible diaphragm portion of the air spring and its location will provide various amounts and directions of lateral loading on the shock absorber strut in order to match the suspension system to a particular vehicle application, and in which the cut-away portion of the retaining can-like member will allow more clearance for the vehicle tire or other vehicle components. Another objective of the invention is to provide a new and improved suspension system which is of a relatively simple design, economical to manufacture, and which will increase the life and effective operation of the shock absorber strut of the suspension system.

These objectives and advantages are obtained by the improved air spring suspension system of the invention, the general nature of which may be stated as including a shock absorber strut having an outer cylinder and a reciprocal piston rod; first attachment means for securing the cylinder to a first vehicle support structure; second attachment means for securing the piston rod to a second vehicle support structure spaced from the first vehicle support structure; a fluid pressure chamber comprising an annular canister mounted against movement relative to the psiton rod, and a flexible sleeve sealingly connected to and extending between said canister and cylinder, said pressure chamber adapted to contain a supply of pressurized fluid to effect expansion and contraction of the flexible sleeve, with said piston rod extending through said pressure chamber; and a rigid retention member surrounding a predetermined portion of the flexible sleeve to restrain outward expansion of said sleeve portion to place a lateral force on the shock absorber strut.

A further objective of the invention is to provide a vehicle suspension system having an air spring combined with a shock absorber strut which includes isolator means for separating the air canister of the air spring from the vehicle chassis by a primary elastomeric isolator, in addition to separating the air canister from the piston rod of the shock absorber strut by a secondary elastomeric isolator, in combination with an intervening bearing.

A still other objective of the invention is to provide such a suspension system in which the canister of the air spring is separated from the vehicle chassis by a main elastomeric isolator ring which is bonded to an adjacent chassis mounting bracket which secures the suspension system to a vehicle support structure; in which the isolator ring is also secured to the outer race of a bearing which surrounds the piston rod and intervening secondary elastomeric isolator, and in which the secondary isolator is a pair of bushings clamped on the piston rod by a pair of spaced washers.

A still further objective is to provide such an improved suspension system in which the secondary isolator, in addition to isolating the piston rod from the air canister, also seals the open end of the air canister with a nonrotating sealing engagement thereby reducing the possibility of leakage; and in which the secondary isolator bushing is considerably more elastic deformable than the outer primary isolator ring in order to prevent small intermittent road forces from being transmitted through the shock absorber strut to the vehicle chassis to enhance the riding comfort of the vehicle passengers.

Still another objective of the invention is to provide such an improved suspension system in which a pair of conical thrust bearings are engaged with the outer race of the suspension bearing and are provided with a low friction sliding surface for sliding engagement therewith; and in which the thrust bearings are engaged with conical surfaces of the outer race to resist side loading exerted on the air canister and the vehicle chassis mounting bracket.

A still further objective of the invention is to provide such an improved suspension system in which the secondary and primary elastomeric isolators and intervening bearing are located in a generally concentric radial configuration about the piston rod of the strut to provide a compact unit which reduces the amount of space required for installation of the suspension system on a vehicle in contrast to prior art suspension systems in which the dual path isolation components are arranged in a vertically stacked relationship with respect to each other.

These further objectives and advantages are obtained by the improved dual path isolator mount for the upper end of a vehicle suspension unit of the type comprising an air spring having a fluid pressure chamber and a shock absorber strut having an outer cylinder and a piston rod extending out of an upper end of the cylinder and through the pressure chamber; wherein said mount includes, bracket means for securing the suspension unit to a vehicle support structure; a primary elastomeric isolator secured to the bracket means providing the main support and isolation between the vehicle and the air spring; bearing means mounted between the primary isolator and a rigid portion of the air spring and secured to the main isolator for providing steering movement of the strut with respect to the vehicle support structure; and a secondary elastomeric isolator secured to the piston rod and said rigid portion of the air spring to provide an end seal for the fluid pressure chamber and isolation between the strut and air spring, with said secondary isolator being more elastic deformable than the primary isolator.

BRIEF DESCRIPTION OF THE DRAWINGS

A preferred embodiment of the invention, illustrative of the best mode in which applicants have contemplated applying the principles is set forth in the following description and is shown in the drawings, and is particularly and distinctly pointed out and set forth in the appended claims.

Similar numerals refer to similar parts throughout the drawings.

BEST MODE FOR CARRYING OUT THE INVENTION

Figures 1, 2:
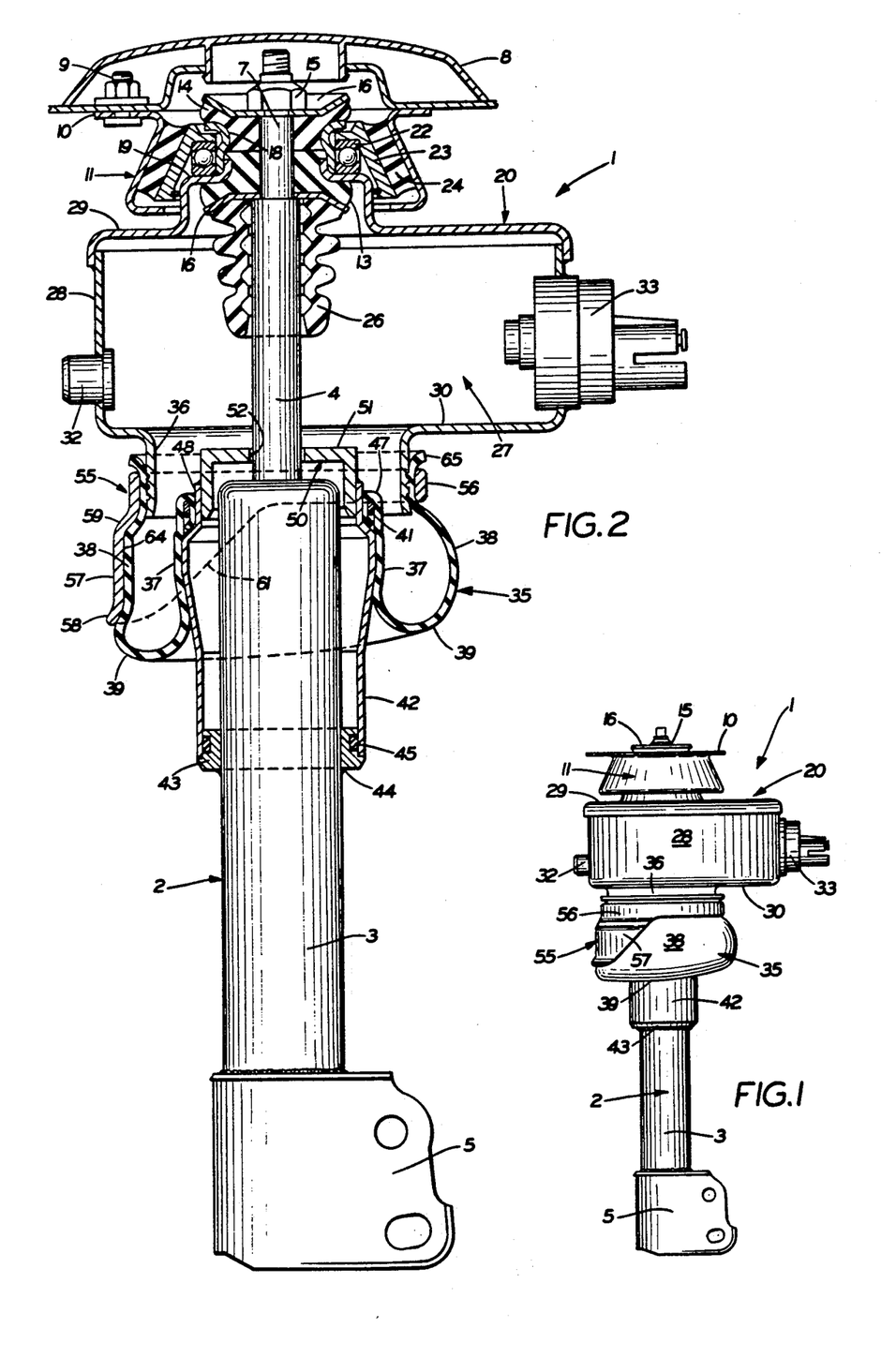
FIG. 1 is a perspective view showing the improved air spring suspension system in elevation.
FIG. 2 is an enlarged view similar to FIG. 1 with portions broken away and in section, showing the upper portion of the suspension system attached to the chasis of a vehicle.
Figure 3:
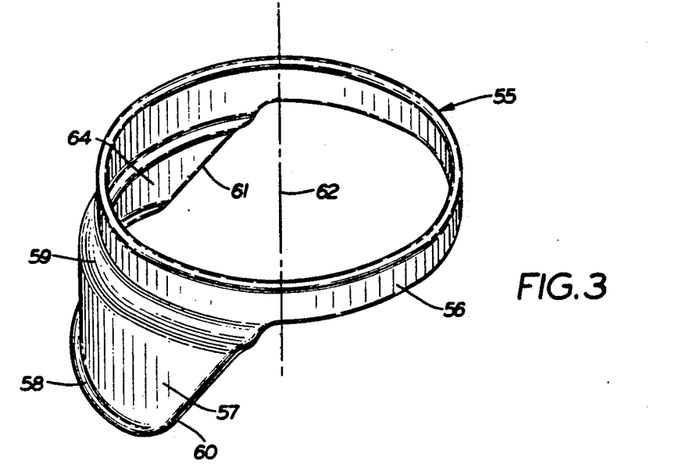
FIG. 3 is a perspective view of the cutaway can-like retention member of the improved suspension system.
Figure 4:
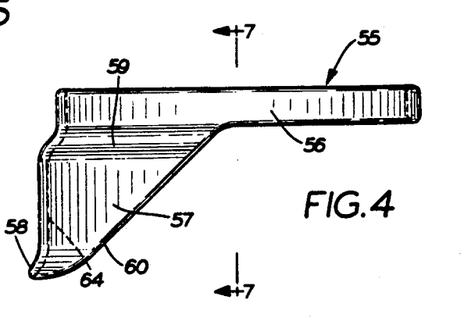
FIG. 4 is a side elevational view of the cutaway retention member of FIG. 3.
Figure 5:
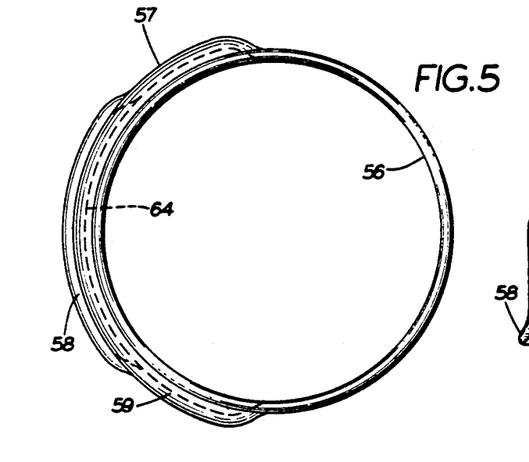
FIG. 5 is a top plan view of the retention member of FIG. 3.
Figure 6:
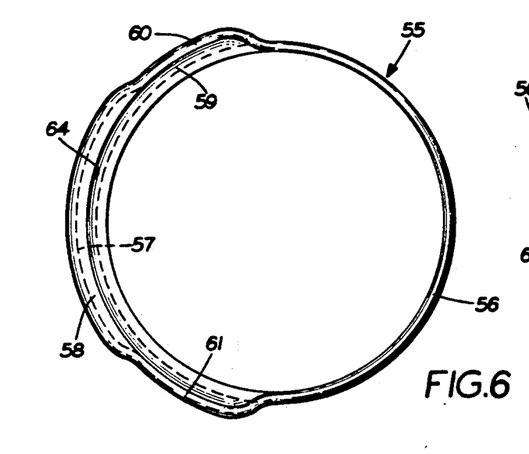
FIG. 6 is a bottom plan view of the retention member of FIG. 3.
Figure 7:
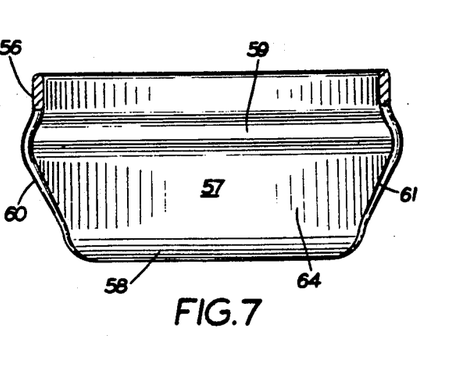
FIG. 7 is a sectional view taken on line 7—7, FIG. 4.

The improved air spring suspension system is indicated generally at 1, and is shown in elevation in FIG. 1 with the components thereof being shown principally in section in FIG. 2. Suspension system 1 includes a usual fluid shock absorber strut, indicated generally at 2, consisting of a cylinder 3 and a piston rod 4 reciprocally mounted therein, having a piston (not shown) located within cylinder 3.

Cylinder 3 is operatively mounted within or upon a wheel spindle or stub axle (not shown) of a vehicle by an attachment bracket 5, the particular mounting arrangement of which is well known in the art. The piston rod upper end 7 is adapted to be operatively connected to an associate portion of a vehicle chassis, indicated at 8, by a plurality of bolts 9 which extend through outer flange portions 10 of an annular mounting cup indicated generally at 11. Piston rod end 7 extends through a pair of resilient bushings 13 and 14 which are clamped by a nut 15 between a pair of washers 16. Bushings 13 and 14 are bonded to an annular ring bearing mounting ring 18 which is mounted on a stepped upper shoulder 19 of a metal or plastic rigid air spring canister, indicated generally at 20. Lower resilient bushing 13 preferably is bonded to the upper portion of air spring canister 20.

An anti-friction bearing ring 22 is seated on stepped shoulder 19 of air spring canister 20 and is secured within a bearing retainer 23 which is bonded to mounting cup 11 by an annular resilient member 24. This mounting arrangement provides a resilient rotatable mount of piston rod 4 to the vehicle chassis.

A resilient annular bumper 26 preferably is bonded to the underside surface of lower washer 16 and is telescopically mounted on the upper end of piston rod 4. Rigid air spring canister 20 forms a major portion of a pressurized air chamber indicated generally at 27, and may include a cylindrical sidewall 28, a top wall 29 having the stepped portion therein through which piston rod 7 extends, and an annular bottom wall 30. A height sensor connector 32 and a solenoid valve 33 may be mounted in openings formed in cylindrical sidewall 28 for controlling the amount of fluid pressure within fluid chamber 27. Rigid canister 20 is mounted against movement with respect to piston rod 4 by its connection with resilient bushing 13 and bearing mounting ring 18.

In accordance with the invention, a flexible sleeve or diaphragm, indicated generally at 35, preferably formed of an elastomeric material, is sealingly mounted on an annular boss 36 formed integrally with and extending downwardly from bottom wall 30 of rigid air spring canister 20. Flexible sleeve 35 is of a generally tubular configuration comprising an inner portion 37 and a radially extending outer portion 38 connected to portion 37 by an integral reversely folded portion 39. The open end of flexible sleeve 35 provided at the end of inner portion 37 is sealingly clamped by a clamping ring 41 to the upper end of an annular sleeve 42. Sleeve 42 is formed of a rigid material and is secured by a collar 43 in a fixed position by welds 44, or the like, to cylinder 3 of strut 2. A sealing 0-ring 45 may be mounted between collar 43 and sleeve 42. Rigid sleeve 42 provides an air spring piston for the air spring portion of the improved suspension system. Inturned end 47 of inner portion 37 of flexible sleeve 35 is clamped against a reduced diameter annular portion 48 of sleeve 42. When referring to sleeve 35 the term flexible means that the sleeve is able to expand and contract outwardly and inwardly due to the resiliency of the rubber material from which it is formed, as the axial spacing between the secured ends thereof changes since the material itself which forms sleeve 35 will have only a very small amount of stretch.

A bumper seat indicated generally at 50, is welded to the interior of reduced end portion 48 of rigid sleeve 42 and has an annular top wall 51 formed with a central opening 52 through which piston rod 4 extends. Top wall 51 is adpated to contact the bottom of annular bumper 26 as shown in FIG. 9 upon the suspension system reaching a severe jounce position to reduce injury to strut 2.

Figure 8:
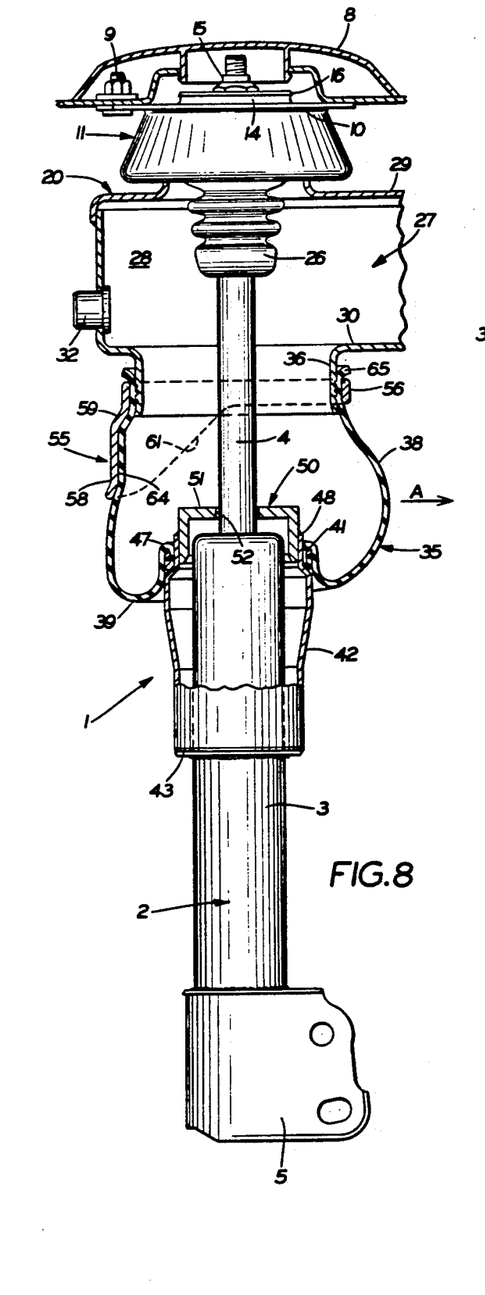
FIG. 8 is a reduced elevational view with portions broken away and in section, similar to FIG. 2, with the suspension system being shown in the rebound or expanded position.
Figure 9:
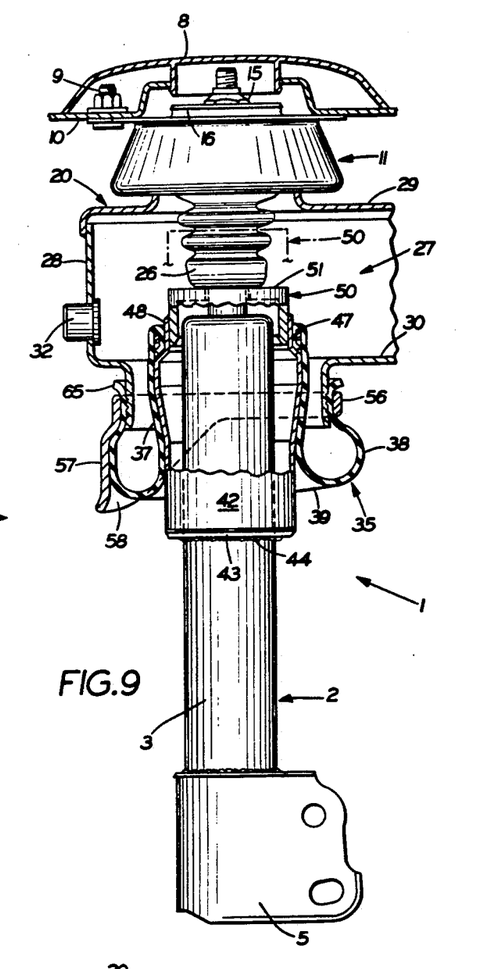
FIG. 9 is an elevational view with portions broken away and in section, similar to FIGS. 2 and 8, with the suspension system being shown in the compressed or jounce position.
Figure 10:
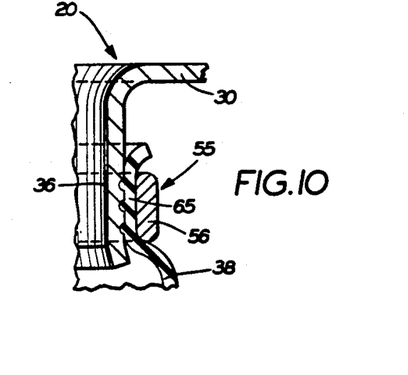
FIG. 10 is an enlarged fragmentary sectional view showing the annular band portion of the cutaway can-like member of FIG. 3 in sealing clamping engagement with one end of the flexible sleeve.

In accordance with the invention, a rigid cutaway can-like member indicated generally at 55 (FIGS. 3-7), is mounted in a fixed position on the lower end of annular boss 36 of air spring canister 20 (FIGS. 2, 8 and 9). Cutaway member 55 preferably is an integral one piece component having an annular clamping band 56 and an axially extending sidewall 57 which terminates in a smooth outturned bottom flange 58. Side wall 57 is connected to band 56 by a smooth stepped annular shoulder 59. Preferably sidewall 57 terminates in a pair of edges 60 and 61 which are at an angle with respect to a centerline axis 62 of annular band 56 and sidewall 57. Preferably sidewall 57 has a smooth concave inner surface 64 and will extend throughout an arcutate length of between 90 degrees and 180 degrees in order to achieve the most efficient results. As shown in FIG. 10, clamping band 56 sealingly clamps open top end 65 of outer sleeve portion 38 against the annular bottom edge of annular boss 36 of rigid air spring canister 20.

FIG. 2 illustrates the improved air spring suspension system in a normal at-rest position in which a predetermined area of outer radial portion 38 of flexible sleeve 35 extends along and is restrained against outward expansion by sidewall 57 of cutaway can member 55 with the unrestrained area of outer sleeve portion 38 bulging outwardly by the internal pressure within chamber 27, as shown by the right-hand portion thereof in FIG. 2. The internal pressure of the fluid within chamber 27 will force the inner portion 37 of flexible sleeve 35 against the walls of rigid annular sleeve 42. This restrained portion of flexible sleeve 35 in combination with the predetermined unrestrained portion thereof will cause a lateral or offset force to be applied to strut 2 to counteract against the offcenter mounting of the strut. Solenoid valve 33 will maintain the desired amount of fluid pressure within the pressurized fluid chamber formed by air spring canister 20 and flexible sleeve or diaphragm 35.

Upon the vehicle wheel encountering a depression in the roadway, the suspension system will assume a rebound position as shown in FIG. 8, in which cylinder 3 will move downwardly with respect to vehicle chassis 8 unrolling folded portion 39 of flexible sleeve 35. Sidewall 57 of cutaway can member 55 prevents a predetermined portion of the flexible sleeve from bowing outwardly as occurs on the unrestrained portion thereof. This retention of a portion of the flexible sleeve or pressure diaphragm will push the pressurized sleeve to one side as illustrated by arrow A in FIG. 8, exerting a lateral force on the piston rod with respect to the cylinder counteracting the usual offset loading thereon.

Upon the vehicle tire encountering a projection in the roadway, the air spring suspension system will move to a jounce position as shown in FIG. 9 in which the air spring piston provided by annular sleeve 42 will move upwardly into pressurized fluid chamber 27, and in combination with the damping and resistance provided by strut 2 will absorb most of the shock and load applied to the vehicle chassis. If a severe projection is encounted by the vehicle wheel, bumper seat 50 may move further upwardly as shown in dot-dash lines in FIG. 9 greatly collapsing resilient bumper 26 preventing damage to the strut. Again, in the jounce position of FIG. 9, the restrained portion of flexible sleeve 35 in combination with the unrestrained portions thereof will produce the offset lateral forces to counteract the unbalance forces occurring on strut 2.

Figure 11:
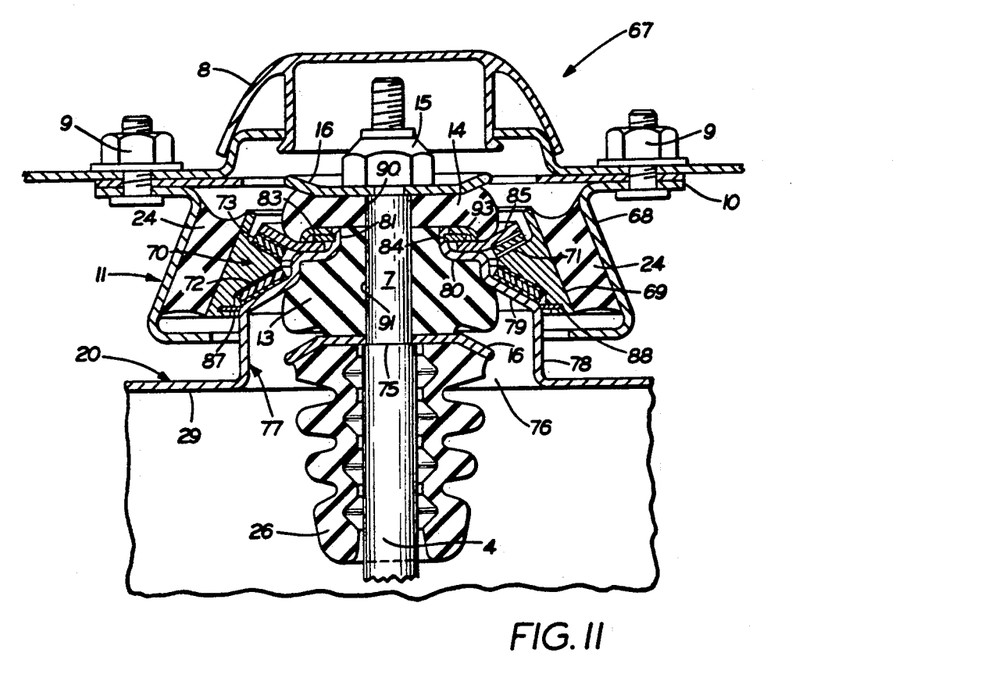
FIG. 11 is a fragmentary view with portions broken away and in section, showing the upper portion of a modified suspension system containing dual path isolators for attaching the air spring to the chassis of a vehicle and to the shock absorbing strut.
Figure 12:
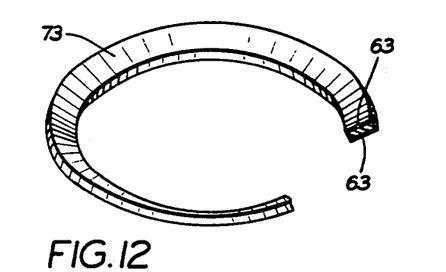
FIGS. 12 and 13 are enlarged fragmentary perspective views with portions broken away and in section, of the upper and lower conical thrust washers removed from the suspension system of FIG. 11.
Figure 13:
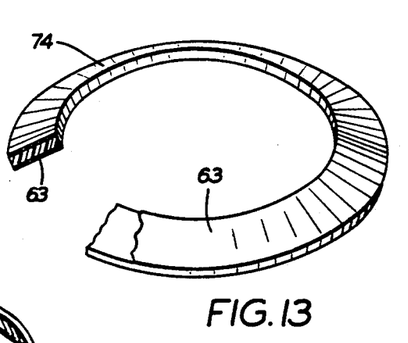
Figure 14:
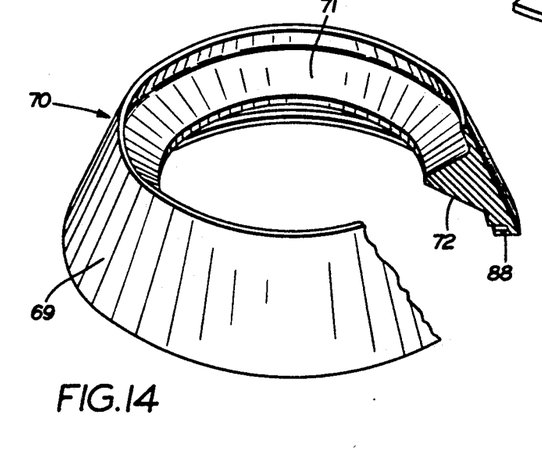
FIG. 14 is an enlarged fragmentary view with portions broken away and in section, of the conical outer race removed from the bearing of the suspension system of FIG. 11.

In accordance with another feature of the invention, a modified vehicle suspension system is shown partially in FIG. 11 and is indicated generally at 67. Modified system 67 includes many of the components shown in FIG. 1 for air suspension system 1. As discussed above with respect to system 1, the annular or ring-like elastomeric resilient member 24, hereinafter referred to as the primary isolator, is bonded to the inner surface of conical wall 68 of mounting cup 11, and is bonded to the outer conical sidewall 69 of an outer bearing race which is indicated generally at 70, and shown in fragmentary in FIG. 14. Outer race 70 includes an upper conical surface 71 and a lower conical surface 72 which converge toward each other for slideably supporting upper and lower conical thrust washers 73 and 74, shown in FIGS. 12 and 13, respectively. Preferably, both top and bottom sliding surfaces of both thrust washers 73 and 74 are coated with a low friction material 63, such as Teflon, to reduce the sliding friction with outer race 69 and with air spring canister 20 as described below.

As discussed above with respect to suspension system 1, resilient bushings 13 and 14 are clamped between upper and lower washers 16 by nut 15 with lower washer 16 resting upon an annular stepped shoulder 75 formed on upper end 7 of piston rod 4. A top opening 76 is formed in top wall 29 of air canister 20 through which piston rod 7 extends including bushings 13 and 14 clamped thereon. Canister opening 76 is defined by an irregularly-shaped upstanding annular wall indicated generally at 77, having a cylindrical wall portion 78 which merges into an inwardly tapered conical wall section 79. Section 79 merges into an annular horizontal wall section 80 and then into an upstanding cylindrical wall section 81.

Figure 15:
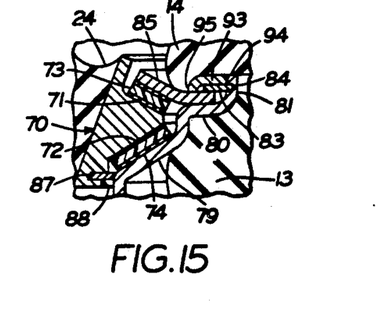
FIG. 15 is an enlarged fragmentary sectional view showing the position of the thrust washers and outer race of FIGS. 12-14 mounted between the pair of elastomeric isolators of the modified suspension system of FIG. 11.

A clip ring 83 (FIG. 15) is mounted in an annular groove 84 formed in upstanding cylindrical wall section 81 for maintaining a beveled retaining washer 85 on the top surface of horizontal wall section 80. Retaining washer 85, in turn, clamps upper conical thrust washer 73 against upper conical surface 71 of outer race 70 as shown particularly in FIGS. 11 and 15. This also clamps lower thrust washer 74 against the outer surface of conical wall section 79 of the air canister and into sliding engagement with lower conical surface 72 of outer race 70. An annular dust seal 87 preferably is mounted in an annular groove 88 formed in the lower end of the inner surface of outer race 70 to prevent dust and debris from entering into the slideably engaged bearing surfaces of the thrust washers and outer race 70.

Upper bushing 14 preferably has an initial cylindrical configuration and is telescopically mounted on upper end 7 of the piston rod which extends through a central opening 90 formed therethrough. Rod end 7 also extends through a central opening 91 formed in lower bushing 13. Bushing 14 is compressed against a retaining washer 93 which is formed with a central opening 94 into which projects cylindrical wall section 81 of canister wall 77. Washer 93 is formed with a downturned peripheral edge 95 which presses against retaining washer 85 clamping the washer tightly against air canister wall section 80.

Clamping washers 16 also compress and expand bushing 13 outwardly into clamping engagement with the adjacent wall sections of canister wall 77. The center of bushing 13 is expanded inwardly to reduce the diameter of central opening 91 sealing tightly against piston rod end 7. The clamping engagement of washers 16 with bushings 13 and 14 provides a fluid tight seal between piston rod end 7 and bushings 13 and 14, and between bushings 13 and 14 and the various sections of canister wall 77 to provide a nonrotating air seal for top opening 76 of the air spring. This same sealing relationship is also obtained in the air spring suspension system 1 of FIG. 2 wherein the bushings are clamped tightly against piston rod end 7 and stepped upper shoulder 19 of the air canister wall and against annular ring 18 shown therein. This provides the same nonrotating air seal for the top opening of the air spring canister 20. A ball bearing ring 22 replaces the pair of thrust washers 73 and 74 and outer race 70 of suspension system 67 in order to provide steering movement between the pneumatic shock absorber strut 2 and the vehicle mounting cup 11.

In accordance with one of the main features of the air spring suspension system of the invention, as shown particularly in FIGS. 2 and 11, is the providing of the dual path isolation by the separation of the air canister from the vehicle chassis by elastomeric ring member 24, in combination with separating the canister from the air strut, and in particular from piston rod end 7 thereof by a secondary elastomeric member comprised of bushings 13 and 14. In addition, the bearing permits movement between the vehicle chassis and air strut.

Furthermore, in accordance with another feature of the invention, secondary isolator bushings 13 and 14 will be of a softer elastomeric material than that of primary isolator 24, that is, will be formed of a greater deformable elastic material. This softer material will prevent or materially reduce small intermittent road forces that are exerted on the strut, from being transmitted through the piston rod and onto the vehicle chassis. These small forces are intermittently exerted on the wheels of the vehicle due to minor irregularities in the road surface such as the pavement separation strips, and if not adequately dampened would provide a rough or noisy ride for the occupants of the vehicle.

Also, the main support for the vehicle chassis from the air spring is provided by primary isolator 24 which must be formed of a less deformable elastic material in order to support the vehicle weight. However, without the intervening softer secondary isolator provided by bushings 13 and 14, the stiffness of isolator 24 would permit these minor vibrations and shock forces to be transmitted from the piston rod through ring 24 and onto the vehicle chassis.

Another feature and advantage provided by the particular suspension system of FIG. 11 is that the engagement of the conical thrust washers with the conical surfaces of outer race 70 enable side forces to be exerted on and absorbed by the suspension unit. Another important feature of the invention is the mounting of primary isolator 24 radially outwardly and generally circumferentially about inner isolator bushings 13 and 14 in combination with the concentrical mounting of the bearings 22 and 70 therebetween. This radial concentric mounting arrangement of the isolators and intervening bearings reduces considerably the amount of space required for mounting of the suspension system on a vehicle in contrast to prior art suspension system having dual path isolators and bearings which are mounted in a vertical stacked relationship. Also the low friction coating on the thrust washers of the bearing provides a self-lubricating effect thereby reducing maintenance on the suspension system. Thus, the suspension system is provided with two separate load paths, namely, a main load supporting path extending from the vehicle chassis through mounting cup 11 and primary isolator 24 to air canister 20, and a secondary load path between air canister 20 and piston rod 4 through secondary isolator bushings 13 and 14.

Thus, the improved suspension system shown particularly in FIGS. 2 and 11 provides dual path isolation to reduce ride harshness and noise in suspension systems using a shock absorbing strut and air spring combination; in which the secondary isolator provides a nonrotating seal for the air spring; and in which the secondary isolator has greater elastic deformation than the primary isolator and can be in the range of between two and one hundred times greater, with a preferred ratio of ten times more elastically deformable or softer than the material that forms primary isolator 24. Also by changing the softness or hardness of either one or both of the isolators, various ride characteristics can be obtained for a variety of vehicles. Likewise, this dual path isolation system will not affect the main function of the air spring or air strut, that is, to absorb severe road shocks exerted on the vehicle upon the wheels entering a depression or striking a raised protrusion in a roadway. Also, the operation of jounce bumper 26 is relatively unaffected by the dual path isolation components.

Accordingly, the improved air spring suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring suspension with dual path isolation is constructed and used, the characteristics of the construction, and the advantageous, new and useful results obtained; the new and useful structures, devices, elements, arrangements, parts, and combinations, are set forth in the appended claims.

What is claimed is:

1. An improved suspension system for vehicles including:
   (a) a fluid shock absorber strut having a cylinder and a reciprocal piston rod;
   (b) a first elastomeric member telescopically mounted on an upper end of the piston rod in a sealing relationship therewith to provide damping when the strut becomes active;
   (c) a fluid pressure chamber comprising a rigid annular member sealingly engaged with an outer surface of the first elastomeric member, and a flexible sleeve sealingly connected to and extending between said rigid member and the cylinder for containing a supply of pressurized fluid with said piston rod extending through the pressure chamber;
   (d) bracket means for securing an upper end of the fluid pressure chamber to a vehicle support structure;
   (e) bearing means located generally radially outwardly from the rigid annular member of the fluid pressure chamber and located between the bracket means and said rigid annular member for providing movement between the bracket means and fluid pressure chamber; and
   (f) a second elastomeric member located between and secured to the bracket means and to the bearing means to provide the primary load support for the vehicle when in a static state, said second elastomeric member being less elastic deformable than the first elastomeric member.

2. The suspension system defined in claim 1 in which the bracket means is an annular mounting cup; and in which the second elastomeric member is ring-shaped and is bonded to the mounting cup and to an outer race of the bearing means.

3. The suspension system defined in claim 1 in which the bearing means has an outer race which is a generally conical-shaped ring; and in which the bearing means further includes a pair of conical thrust washers.

4. The suspension system defined in claim 3 in which the conical thrust washers have a low friction sliding surface.

5. The suspension system defined in claim 3 in which one of the thrust washers is mounted between the outer race and a conical washer which forms a first inner race; and in which the other of said thrust washers is mounted between the outer race and a conical wall section of the rigid annular member of the fluid pressure chamber which forms a second inner race.

6. The suspension system defined in claim 2 in which the annular mounting cup has a central bottom opening; and in which the piston rod and first elastomeric member extend upwardly through said bottom opening and are located within the interior of said mounting cup.

7. The suspension system defined in claim 3 in which the outer race has an inner surface formed with a pair of converging conical surfaces; in which each of the conical thrust washers is seated on a respective one of said conical surfaces; and in which the outer race completely surrounds the first elastomeric member.

8. The suspension system defined in claim 1 in which the bearing means is a ball bearing ring.

9. The suspension system defined in claim 1 in which the first elastomeric member is a pair of bushings mounted in a vertical stacked relationship on the upper end of the piston rod; and in which a pair of spaced clamping washers are mounted on the piston rod and compress the pair of bushings into the sealing relationship with the piston rod.

10. The suspension system defined in claim 9 in which the spaced clamping washers also compress and expand at least one of the bushings into the sealing relationship with the rigid annular member of the fluid pressure chamber.

11. The suspension system defined in claim 9 in which a jounce bumper is mounted on the piston rod and is secured to a bottom surface of one of the clamping washers.

12. The suspension system defined in claim 7 in which the upper thrust washer is clamped against the outer race by a retaining washer and clip ring.

13. The suspension system defined in claim 1 in which the first elastomeric member provides the sealing relationship for the rigid annular member of the fluid pressure chamber and the piston rod.

14. A dual path isolator mount for the upper end of a vehicle suspension system comprising a fluid pressure chamber and a shock absorber strut having an outer cylinder and a piston rod extending out of an upper end of the cylinder and through the pressure chamber, said system including:
(a) bracket means for securing the suspension system to a vehicle support structure, said bracket means being bonded to an outer surface of an elastomeric ring to provide the primary load support and a first isolator path for the vehicle when in a static state;
(b) an outer metal race ring bonded to an inner surface of the elastomeric ring;
(c) elastomeric bushing means telescopically mounted on an upper end of the piston rod in a sealing relationship with the piston rod and fluid pressure chamber for providing a second isolator path by damping the piston rod when said rod becomes active, with said elastomeric bushing means being more elastic deformable than the elastomeric ring; and
(d) bearing means mounted between the outer race and the elastomeric bushing means in a generally radially outward direction from the piston rod for rotatably mounting the upper end of the piston rod and elastomeric bushing means with respect to the bracket means and elastomeric ring.

15. The isolator mount defined in claim 14 in which the elastomeric bushing means includes a pair of bushings, each telescopically mounted on the upper end of the piston rod; and in which said bushings are clamped together and into sealing relationship with the piston rod by a pair of washers mounted in a spaced relationship on the piston rod.

16. The isolator mount defined in claim 14 in which the bearing means includes a pair of conical thrust washers slideably engaged with the outer race and an inner race.

17. The isolator mount defined in claim 16 in which the thrust washers each have a low friction surface for sliding engagement with the outer race.

18. The isolator mount defined in claim 14 in which the fluid pressure chamber includes a rigid annular upper member and a flexible sleeve; and in which the upper member is sealingly engaged with the bushing means and the sleeve is sealingly connected to and extends between said upper member and the shock absorber cylinder.

19. The isolator mount defined in claim 18 in which the rigid upper member is an annular canister having a stepped upper end which defines a top opening for the fluid pressure chamber; in which the piston rod extends through said top opening; and in which the bushing means is expanded outwardly into engagement with the stepped upper end of the canister to provide the sealing relationship between the bushing means and fluid pressure chamber.

20. A dual path isolator mount for the upper end of a vehicle suspension unit of the type having an air spring and a shock absorber strut, said strut having an outer cylinder and a piston rod extending out of an upper end of the cylinder and through a fluid pressure chamber of the air spring; said mount including:
(a) bracket means for securing the suspension unit to a vehicle chassis;
(b) a primary elastomeric isolator secured to the bracket means providing the main support and isolation between the vehicle chassis and the air spring;
(c) bearing means mounted between and secured to the primary isolator and the air spring for providing steering movement of the strut with respect to the vehicle chassis; and
(d) a secondary elastomeric isolator secured to the piston rod and to the air spring providing a seal for the fluid pressure chamber and isolation between the strut and air spring, with said secondary isolator being more elastic deformable than the primary isolator.

* * * * *